United States Patent [19]

Liu et al.

[11] Patent Number: 4,795,735
[45] Date of Patent: Jan. 3, 1989

[54] ACTIVATED CARBON/ALUMINA COMPOSITE

[75] Inventors: Paul K. T. Liu, Pittsburgh; Robin K. Bergstrom, Natrona Heights; David G. Gatty, Tarentum, all of Pa.

[73] Assignee: Aluminum Company of America, Pittsburgh, Pa.

[21] Appl. No.: 911,317

[22] Filed: Sep. 25, 1986

[51] Int. Cl.$^4$ .................... B01J 20/08; B01J 20/20
[52] U.S. Cl. ............................ 502/415; 55/74; 210/684; 210/694; 502/417
[58] Field of Search ............... 502/415, 413, 417, 182

[56] References Cited

U.S. PATENT DOCUMENTS

| | | | |
|---|---|---|---|
| 1,441,696 | 1/1923 | McNeil et al. | 502/417 |
| 1,530,392 | 3/1925 | Morrell | 502/413 |
| 3,135,696 | 6/1964 | Ruelle et al. | 252/182 |
| 3,658,724 | 4/1972 | Stiles | 252/446 |
| 3,842,014 | 10/1974 | Friend et al. | 252/447 |
| 3,876,451 | 4/1975 | Zall | 117/62 |
| 4,058,483 | 11/1977 | Henbest | 502/413 |
| 4,499,208 | 2/1985 | Fuderer | 502/415 |
| 4,579,839 | 4/1986 | Pearson | 502/439 |
| 4,677,086 | 6/1987 | McCue et al. | 502/413 |

FOREIGN PATENT DOCUMENTS

| | | | |
|---|---|---|---|
| 55-132635 | 10/1980 | Japan | 502/417 |
| 57-170861 | 10/1982 | Japan | 502/182 |
| 60-87853 | 5/1985 | Japan | 502/415 |

*Primary Examiner*—Paul E. Konopka
*Attorney, Agent, or Firm*—Andrew Alexander

[57] ABSTRACT

Disclosed is a method of preparing an activated carbon/alumina composite. The method includes providing a blend containing activated alumina powder and activated carbon powder. Added to the blend is an aqueous solution to form a mixture. A green body is then formed from the mixture and heated to form the activated carbon/alumina composite.

18 Claims, No Drawings

ACTIVATED CARBON/ALUMINA COMPOSITE

INTRODUCTION

This invention relates to absorbants and more particularly, it relates to an activated carbon/alumina composite and method of preparing the same suitable for use in absorption processes.

The use of activated carbon is considered to be one of the most economical methods for treating water for the removal of a wide range of pollutants. Its heterogeneous pore structure is suitable for removing most waste water pollutants although its capacity for an individual pollutant varies.

Activated carbon is used in drinking water treatment for removing organic pollutants including objectional taste and odor. Although it is able to adsorb some inorganic molecules, e.g., phosphates and chromates, adsorption sites available for these components are quite limited. Because of lack of capacity for inorganic materials, the adsorber service life is shortened although the overall saturation capacity may not be reached for the organic material.

In gas separation and purification, activated alumina has been used very frequently to remove trace molecules such as carbon dioxide and ammonia because activated alumina has a high absorption capacity for these materials at low concentration ranges. However, gas waste streams often contain other pollutants such as non-polar hydrocarbons, e.g. methane, which activated alumina only weakly absorbs. This requires an additional step for removal of such organic materials. Thus, it will be understood that there is a great need for an absorption material which would absorb both kinds of pollutants.

In the prior art, U.S. Pat. No. 4,499,208 discloses activated carbon pellets suitable for use in the absorbent beds of pressure swing adsorption systems. The carbon pellets are prepared by mixing a volume-based higher heat capacity, inert inorganic material with a partially activated carbon powder prior to pelletizing of the powder. Dense alumina in the form of corundum is used for this purpose. However, the activated carbon in the form of powder is treated by the addition of a binder such as pitch, bitumen, tar and tar oil followed by pelletizing of the powder-binder mixture. The resulting doped adsorbent is designed to enhance the operation of adiabatic pressure swing adsorption processes by decreasing the cyclic temperature change in the adsorbent bed during each processing cycle of the process.

U.S. Pat. No. 1,530,392 discloses a process for making compound adsorbent catalysts wherein the active catalytic components are introduced into a charcoal body which generally serves as a carrier but sometimes is capable of functioning as a catalyst as well as a carrier or absorbing agent. According to the patent, the active catalytic components are metallic and other elementary substances, including aluminum, zinc, cobalt, copper, etc., and oxides and other compounds of these metals.

U.S. Pat. No. 3,135,696 discloses a process for the preparation of aluminum oxide and carbon based briquettes for reducing the aluminum oxide with carbon.

U.S. Pat. No. 3,658,724 discloses an absorbent oxidation catalyst comprised of an adsorbent which can be a non-combustible refractory of high surface area such as silica, alumina or activated carbon mixed with such refractory. However, the adsorbent has an oxidation catalyst incorporated therein or on its outer surfaces.

U.S. Pat. No. 3,842,014 discloses graphite-alumina pellets consisting essentially of a gas or vacuum ground graphite of surface area 50–2000 square meters per gram, and, as a binder, alumina of pseudoboehmite structure of crystalline size less than 10 manometers and of surface area 200–600 square meters per gram.

The present invention provides an improved adsorbent comprised of activated alumina and activated carbon.

SUMMARY OF THE INVENTION

It is an object of the present invention to provide an activated carbon/alumina composite.

It is another object of the present invention to provide a green body of activated alumina and activated carbon containing controlled amounts of an aqueous solution for bonding the green body.

It is yet another object of the present invention to provide high adsorbing bodies of activated alumina and activated carbon.

And yet it is another object of the present invention to provide a composite capable of removing organic and inorganic contaminants from waste streams.

And yet it is a further object of the present invention to provide a process for removing metallic ions and organic contaminants from waste liquids using an activated alumina and activated carbon composite.

And it is yet a further object of this invention to provide a process for removing polar and nonpolar contaminants from gaseous waste streams using an activated alumina and activated carbon composite.

These and other objects will become apparent from the drawings, specification and claims appended hereto.

In accordance with these objects, there is provided an activated carbon/alumina composite suitable for use as an adsorbent in purifying liquid or gaseous streams, for example, and a method of preparing the same comprising blending activated alumina powder and activated carbon powder with a controlled amount of an aqueous solution to form a mix. A green body is formed from the mix and the composite is heated to rehydratably bond the activated alumina to the activated carbon.

DETAILED DESCRIPTION OF THE PREFERRED EMBODIMENTS

A composite in accordance with the invention can be prepared by first providing a blend of powders of each constituent. That is, activated alumina is blended with activated carbon to provide a homogeneous mixture thereof. Activated carbon as used herein can include carbonaceous material such as lampback, charcoal, sugar charcoal, carbon produced from oil products and the like which remain after heating or partial burning and undergoes activation when carbon is reacted with steam, for example. Other activation processes known in the art may also be used. For use in the present invention, the activated carbon powder can have a particle size in the range of 80 to 600 mesh (U.S. Sieve Series). Because of the uniqueness of the composite, either granular activated carbon or activated carbon fines or both may be used. The subject composite is much less sensitive to pore volume with respect to the activated carbon phase and thus provides one of the advantages over the use of either constituent alone. That is, activated alumina as a binder does not result in a loss of pore volume in activated carbon. By comparison, the use of an organic binder for activated carbon results in the loss of pore volume. The pore volume of the activated carbon can be as low as 0.1 cc/gm, for example, with the higher levels of pore volume, for example, 1.0 cc/gm or higher, not presently known to be detrimental.

Activated alumina useful in the present invention can have a particle size in the range of 0.1 to 10 micrometers, preferably about 2.0 micrometers. Activated alumina useful in the present invention is described in U.S. Pat. No. 4,579,839, incorporated herein by reference. The activated alumina may be obtained from Alcoa under the designation CP2, for example.

This as well as other objects which will become apparent in the discussion that follows are achieved, according to the present invention, by providing: (1) rehydration bondable alumina of median particle size less than about 5 microns, LOI (250° to 1100° C.) 4 to 12% by weight, and having the ability to yield rehydration bonded objects of lower density and higher strength as compared with objects made of seven micron rehydration bondable alumina, or density less than 0.9 cm$^3$/g at strength about equal to or greater than 7 MPa; (2) rehydration bondable alumina having the ability to yield rehydration bonded objects having at least 0.6 cc of pore volume per gram for pores smaller than 300 Å. Also encompassed are materials containing such aluminum and originating from, e.g., bauxite. In other variants of the invention, the alumina of (1) above is less than about 4, 3, 2 or even 1 micron. In additional variants of the invention, the alumina of (2) above has the ability to achieve at least 0.7, and even at least 0.8, cc of pore volume per gram of pores smaller than 300 Å.

The amount of activated alumina in the blend can range from 10 to 90 wt.% with the balance activated carbon. Preferably, activated alumina is in the range of 15 to 60 wt.% with a typical range being 20 to 30 wt.%, the balance activated carbon.

After the blend is thoroughly mixed, an aqueous solution, e.g. water, is added in an amount at least to permit the activated alumina to rehydratably bond to the carbon particles.

Preferably, the amount of water added does not exceed that which prevents the mix from being extruded or agglomerated. Typically, the amount of water or aqueous solution in the mix is 20 to 50 wt.%, the remainder comprised of the blend of activated alumina and activated carbon. Normally, the aqueous solution would not comprise more than 60 wt.% of the mix, and preferably, it is in the range of 40 to 50 wt.%.

After the water addition for rehydration purposes, the mix is then subjected to a shaping or forming process using an extruder, for example, which provides a green body. That is, after forming as by extruding into strands, the green body has sufficient dimensional stability for handling purposes. To provide the activated carbon/alumina composite, the green body may be heated for bonding the alumina and carbon by rehydration of the alumina. The bonding can occur in very short periods, for example, ½ to 3 hours, although the time can be shorter when the temperature is higher. Temperatures in the range of 25° to 100° C. or higher are sufficient for rehydration bonding purposes of the alumina to the carbon.

In the present invention, it is important that the carbon surface be wettable by the aqueous solution. Thus, when the aqueous solution is water, a dispersant may be used to enhance the wettability of the carbon surface. A suitable dispersant is Nopcosperse 44, available from Diamond Shamrock, or Darvan 821, available from R. T. Vanderbilt. The addition of such dispersant promotes wettability of the carbon surface by the aqueous solution which results in a homogeneous mix suitable for forming. The amount of dispersant added is in the range of 0.05 to 0.5 wt.% based on the weight of solids present. A preferred amount of dispersant is in the range of 0.07 to 0.3 wt.%.

For purposes of increasing the strength of the composite adsorbent, it may be subjected to an aging treatment. Thus, the adsorbent may be aged by exposing to a steam atmosphere for a period of ½ to 3 hours, typically 1 hour, at 110° C. steam atmosphere. Alternatively, the composite may be aged in water, e.g., 2 to 4 hours at 60° to 85° C.

The composite may be strengthened by peptizing with the addition of nitric acid to the mix. Nitric acid may be added in the range of 1 to 6 wt.%, typically 4 wt.%, based on the weight of solids.

While it may not be necessary to the use of the carbon/alumina composite as an adsorbent, dopants, such as zeolites, resins, binders and fillers may be used with or without water to change the properties of the composite.

Composites fabricated in accordance with the present invention have the advantage that small, weakly adsorbably (primarily polar) components can be adsorbed well by activated alumina contained in the composite, particularly in the low concentration range. The competition effect by molecules strongly adsorbable by activated carbon is minimized or no longer exists, while competition from other alumina adsorbably components is present only to a lesser extent. In addition, the composite total adsorption capacity for organic pollutants in water is reduced because of the use of activated alumina; however, its breakthrough capacity is comparable to activated carbon's alone. The composite of the present invention has the advantage that it has a low regeneration cost which allows more frequent regeneration. Also, in the composite, activated carbon responsibilities are limited to the removal of non-polar or large molecules; consequently, it is not necessary to have a large capacity of micropore volume for the removal of weakly adsorbable polar components. This permits a low temperature, e.g., less than 500° C., regeneration inside the absorber. Thus, there is no oxidation loss during thermal regeneration.

A carbon/alumina composite may be fabricated by means of extrusion, agglomeration or pelletization. With its unique rehydration property, alumina can serve as a binder as well as an absorbent. Additional binders may be added, if necessary, to reinforce particle strength for the composite containing a low ratio of alumina.

Ten composite adsorbents were prepared, the weight percent activated carbon, activated alumina and dispersant (Nopcosperse 44) used are set forth in Table I. Sufficient water was added in each case to permit the mix to be extruded. Aging and peptizing treatment of the composite adsorbents is also as set forth in Table I. In each case, the desired amount of activated carbon and activated alumina was placed in a Simpson Mix/Muller and dry mixed for 5 minutes. The water and dispersant were mixed for over a period of 12 minutes and then mulled for an additional 3 minutes before extruding. The extruded samples were steam aged immediately for 1 hour at 110° C. and selected samples water aged at 85° C. for 4 hours. The results of tests on the extruded composite adsorbents are also provided in Table I. It should be noted that the total pore volume did not differ significantly regardless of the procedure used.

TABLE I

| Sample Number | Properties of Activated Carbon/Alumina Extrudate Adsorbents | | | | | | | | | |
|---|---|---|---|---|---|---|---|---|---|---|
| | 4575-1A | 4575-1B | 4576-1A | 4576-1B | 4575-2A | 4575-2B | 4576-2A | 4576-2B | 4557-3 | 4559-2 |
| Extruder Unit | 1" | 1" | 1" | 1" | 1" | 1" | 1" | 1" | 1" | Pilot 4" |
| % Activated Carbon | 80 | 80 | 70 | 70 | 80 | 80 | 70 | 70 | 60 | 60 |
| % Activated Alumina (Alcoa CP2) | 20 | 20 | 30 | 30 | 20 | 20 | 30 | 30 | 40 | 40 |
| Dispersant | 0.3% | 0.3% | 0.3% | 0.3% | 0.3% | 0.3% | 0.3% | 0.3% | 0.3% | 0.3% |
| $HNO_3$ Acid (70%) | No | No | No | No | 4% | 4% | 4% | 4% | No | No |
| Aging | St | St + $H_2O$ | St | St + $H_2O$ | St | St + $H_2O$ | St | St + $H_2O$ | St | St |
| HE Density, g/cc | 2.30 | 2.29 | 2.37 | 2.35 | 2.30 | 2.30 | 2.36 | 2.34 | 2.50 | 2.47 |
| Total Pore Vol. cc/g | 0.71 | 0.73 | 0.65 | 0.63 | 0.74 | 0.70 | 0.63 | 0.65 | 0.67 | 0.66 |
| Surface Area $M^2G$ | 737 | 675 | 683 | 647 | 736 | 549 (596) | 654 | 653 | 720 | 696 |
| Crush Strength, lbs. | 1.0 | 0.6 | 3.2 | 4.0 | 1.5 | 1.7 | 3.7 | 4.5 | 4.5 | 4.5 |

St = steam age for 1 hour at 110° C.
St + $H_2O$ = steam age for 1 hour at 110° C. and water age at 85° C. for 4 hours Activated carbon has the capacity to absorb up to about 0.94 wt.% phenol from a solution containing $1.0 \times 10^{-4}$ moles/l of phenol at a pH=4 and at the same time has very little capacity for inorganic compounds such as potassium dichromate. Activated alumina, on the other hand, does not adsorb phenol contained in this solution. However, activated alumina has about 1 wt.% capacity for adsorbing potassium dichromate at a pH=4. Thus, it will be seen that the activated carbon-/alumina composite would have the ability to remove both phenol and potassium dichromate from waste streams. The capacity for each component should be proportional to the percent of the activated material in the composite.

Similarly, in the gas phase streams, activated alumina has high capacity for absorption of $CO_2$, for example, and activated carbon does not. Activated carbon, however, has high absorption capacity for organic materials, e.g., methane. Thus, it will be appreciaed that a composite in accordance with the present invention has the capacity to remove both types of material where the individual components do not.

While the invention has been described in terms of preferred emboiments, the claims appended hereto are intended to encompass other embodiments which fall within the spirit of the invention.

What is claimed is:

1. A process for preparing an activated carbon-/alumina composite comprising the steps of:
   (a) providing a blend containing activated alumina powder and activated carbon powder and adding to said blend a liquid selected from water and an aqueous solution to form a mixture;
   (b) forming a green body from said mixture wherein said alumina is rehydratably bonded to provided said green body having carbon dispersed therein; and
   (c) heating the green body for a time sufficient to increase the strength thereof and form the activated carbon/alumina composite.

2. The process in accordance with claim 1 wherein the activated carbon has a particle size in the range of 80 to 600 mesh.

3. The process in accordance with claim 1 wherein the activated carbon has a pore volume of at least 0.1 cc/gm.

4. The process in accordance with claim 1 wherein the activated carbon has a pore volume of up to 1.2 cc/gm.

5. The process in accordance with claim 1 wherein the activated alumina has a particle size in the range of 0.1 to 10 micrometers.

6. The process in accordance with claim 1 wherein the blend contains activated alumina in the range of 10 to 90 wt.%.

7. The process in accordance with claim 1 wherein the blend contains activated alumina in the range of 15 to 60 wt.%.

8. The process in accordance with claim 1 wherein the blend contains activated alumina in the range of 20 to 30 wt.%.

9. The process in accordance with claim 1 wherein the mixture contains up to 60 wt.% aqueous solution.

10. The process in accordance with claim 1 wherein the mixture contains from 20 to 50 wt.% aqueous solution.

11. The process in accordance with claim 1 wherein a dispersant is added to enhance the wettability of the carbon powder with the aqueous solution.

12. The process in accordance with claim 11 wherein the amount of dispersant is in the range of 0.05 to 0.5 wt.%.

13. An activated carbon/alumina composite suitable for use as an adsorbent, the composite comprised of a mixture of activated carbon having a pore volume of at least 0.1 cc/gm and rehydration bondable alumina present in an amount of 10 to 90 wt. % of said mixture, the composite resulting from a mixture of activated carbon powder and activated alumina with water added thereto, formed into a green body and heated for a time sufficient to increases the strength thereof and form the activated carbon/alumina composite, the composite having a crush strength of at least 1.7 lbs for a one-inch diameter extrudate, said carbon dispersed in said composite.

14. The composite in accordance with claim 13 wherein the activated carbon has a pore volume of up to 1.2 cc/gm.

15. The composite in accordance with claim 13 wherein the activated alumina has a particle size in the range of 0.1 to 10 micrometers.

16. The composite in accordance with claim 13 wherein the blend contains activated alumina in the range of 15 to 60 wt.%.

17. An activated carbon/alumina composite suitable for use as an adsorbent, the composite comprised of a mixture of activated carbon and rehydration bondable alumina, the activated carbon dispersed in the composite and having a pore volume in the range of 0.1 to 1.2 cc/gm, the composite resulting from a mixture of activated carbon powder and activated alumina with water added thereto, formed into a green body and heated for a time sufficient to increase the strength thereof and form the activated carbon/alumina composite, the activated alumina having a particle size in the range of 0.1 to 10 micrometers and being in the range of 15 to 60 wt.%.

18. An activated carbon/alumina composite suitable for use as an adsorbent, the composite comprised of a mixture of activated carbon having a pore volume of at least 0.1 cc/gm and rehydration bondable alumina which is present in an amount of 10 to 90 wt% of said mixture, the composite resulting from a mixture of activated carbon powder and activated alumina with water added thereto, formed into a green body and heated for a time sufficient to increase the strength thereof and form the activated carbon/alumina composite, the activated alumina having a particle size in the range of 0.1 to 5 micrometers, said carbon dispersed in said composite.

* * * * *